(12) United States Patent
Mountz

(10) Patent No.: US 10,794,490 B2
(45) Date of Patent: Oct. 6, 2020

(54) HIGH PRESSURE SEAL

(71) Applicant: Trelleborg Sealing Solutions US, Inc., Fort Wayne, IN (US)

(72) Inventor: John J. Mountz, Kendallville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 116 days.

(21) Appl. No.: 15/883,820

(22) Filed: Jan. 30, 2018

(65) Prior Publication Data

US 2018/0149271 A1 May 31, 2018

Related U.S. Application Data

(63) Continuation of application No. PCT/US2015/043157, filed on Jul. 31, 2015.

(51) Int. Cl.
*F16J 15/32* (2016.01)
*F16J 15/3204* (2016.01)
*F16J 15/16* (2006.01)
*F16J 15/3208* (2016.01)
*F16J 15/3252* (2016.01)

(52) U.S. Cl.
CPC ......... *F16J 15/3204* (2013.01); *F16J 15/164* (2013.01); *F16J 15/3208* (2013.01); *F16J 15/3252* (2013.01)

(58) Field of Classification Search
CPC .... F16J 15/3204; F16J 15/164; F16J 15/3208; F16J 15/3252
See application file for complete search history.

(56) References Cited

U.S. PATENT DOCUMENTS

| 2,800,376 | A | | 7/1957 | Traupmann et al. |
| 5,149,107 | A | * | 9/1992 | Maringer ............ F16J 15/3208 277/556 |
| 6,036,191 | A | * | 3/2000 | Millard ................. B62D 5/083 277/411 |
| 6,264,205 | B1 | | 7/2001 | Balsells |
| 6,641,141 | B2 | * | 11/2003 | Schroeder ............ F16J 15/166 277/552 |
| 8,096,559 | B2 | | 1/2012 | Cook |
| 8,328,202 | B2 | | 12/2012 | Foster et al. |
| 8,720,902 | B2 | * | 5/2014 | Kofler .................... F16J 15/002 277/558 |
| 9,194,497 | B2 | * | 11/2015 | Rastegar ............. F16J 15/3212 |
| 2009/0289418 | A1 | * | 11/2009 | Cook .................. F16J 15/3212 277/309 |
| 2010/0237565 | A1 | * | 9/2010 | Foster ................... F16J 15/164 277/377 |

(Continued)

FOREIGN PATENT DOCUMENTS

GB  1 464 452  2/1977

OTHER PUBLICATIONS

Extended European Search Report dated Mar. 26, 2019 for European Patent Application No. 15 90 0520 (8 pages).

(Continued)

*Primary Examiner* — Gilbert Y Lee
(74) *Attorney, Agent, or Firm* — Taylor IP, P.C.

(57) ABSTRACT

A seal includes a support ring; a sealing ring locked with the support ring to form an enclosed space therebetween, the sealing ring including at least one seal lip; and an energizer held in the enclosed space and contacting the sealing ring.

17 Claims, 4 Drawing Sheets

(56) References Cited

U.S. PATENT DOCUMENTS

| | | | |
|---|---|---|---|
| 2011/0037234 A1* | 2/2011 | Balsells | F16J 15/3212 |
| | | | 277/562 |
| 2012/0299247 A1 | 11/2012 | Heinrich et al. | |
| 2014/0210166 A1 | 7/2014 | Balsells et al. | |
| 2014/0291936 A1 | 10/2014 | Grimanis et al. | |
| 2015/0061227 A1 | 3/2015 | Rastegar | |
| 2016/0223086 A1* | 8/2016 | Balsells | F16J 15/3212 |
| 2018/0112778 A1* | 4/2018 | Dilmaghanian | F16J 15/3212 |

OTHER PUBLICATIONS

International Search Report and Written Opinion of the International Searching Authority dated Apr. 8, 2016 for International Application No. PCT/US2015/043157 (11 pages).

* cited by examiner

HIGH PRESSURE SEAL

CROSS REFERENCE TO RELATED APPLICATIONS

This is a continuation of PCT application No. PCT/US2015/043157, entitled "HIGH PRESSURE SEAL", filed Jul. 31, 2015, which is incorporated herein by reference.

BACKGROUND OF THE INVENTION

1. Field of the Invention

The present invention relates to seals, and, more particularly, to ring seals.

2. Description of the Related Art

A seal is a device used to separate media from one side of the seal to the other side of the seal. Seals can come in a great variety of sizes and shapes, depending on their application. One particular type of seal is a rotary seal, which seals around rotating or oscillating objects, such as a shaft, in a housing. Rotary seals are typically formed in ring shapes that surround the shaft and have seal lips that form a fluid-tight seal.

Many problems with known rotary seals tend to occur when the seals are used in applications where there are high pressures and/or rotational speeds of the shaft. One such problem is due to high frictional torques that are produced by the high pressure environment and applied to the shaft. Another problem is due to the high temperature from frictional heating due to contact between the shaft and seal under high speed situations. If the motor driving the shaft is not powered sufficiently to overcome the frictional torque, the high frictional torque can cause a standstill of the shaft's rotating movement. The friction between the seal interface and the shaft can also cause high temperatures to develop that wears the seal, and causes damage to fluids, hardware, and other elements near the seal. Another problem that frequently occurs is extrusion of the seal material, which can be a relatively soft material like polytetrafluoroethylene (PTFE), into the space between the shaft and the housing. Yet another problem that causes premature seal failure is co-rotation between the seal and the shaft. The relative movement of the seal against the housing wall causes accelerated wear to the seal components and can accelerate extrusion of the seal material.

What is needed in the art is a seal that can be used in high pressure and/or high rotational speed applications that overcomes some of the disadvantages of known seals.

SUMMARY OF THE INVENTION

The present invention provides a sealing ring and a support ring locked together to form an enclosed space with an energizer held in the enclosed space and contacting the sealing ring.

The invention in one form is directed to a seal including: a support ring; a sealing ring locked with the support ring to form an enclosed space therebetween, the sealing ring including at least one seal lip; and an energizer held in the enclosed space and contacting the sealing ring.

The invention in another form is directed to a seal including: a sealing ring having a cavity formed therein and at least one seal lip on an inner radius of the sealing ring, the at least one seal lip being at least partially radially aligned with the cavity formed in the sealing ring; and an energizer held within the cavity of the sealing ring and biasing the at least one seal lip radially inward.

An advantage of the present invention is the support ring can be radially locked within a housing of a device and the sealing ring is locked to the support ring to prevent relative co-rotation between the sealing ring and shaft.

Another advantage is the support ring can prevent the sealing ring from extruding into the space between the shaft and housing.

Yet another advantage is the energizer being enclosed protects the energizer from the full system pressure during operation.

Yet another advantage is the seal can be used in both unidirectional and bi-directional applications.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
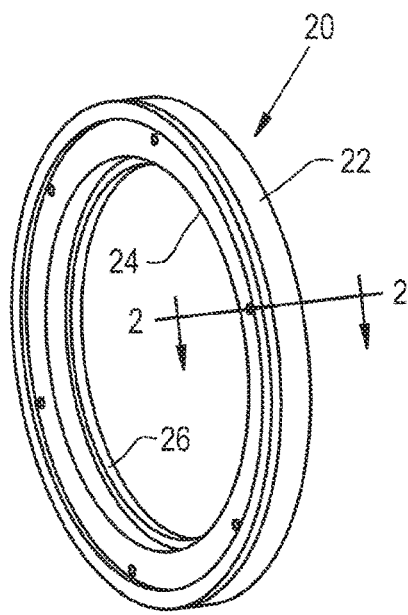
FIG. 1 is a perspective view of an embodiment of a seal according to the present invention configured for unidirectional sealing applications.

Referring now to the drawings, and more particularly to FIG. 1, there is shown an embodiment of a seal 20 according to the present invention which generally includes a support ring 22 that is locked with a sealing ring 24 having a seal lip 26 formed therein. The support ring 22 and sealing ring 24 are locked together such that the seal 20 maintains a ring shape and can be placed on a shaft or other rotating object. While not shown, the support ring 22 can be locked in a gland, bore, or other opening in a housing using an interference fit before locking to the sealing ring 24 so that the support ring 22 is rotationally locked due to the interference fit and the sealing ring 24 becomes rotationally locked from being locked to the support ring 22. This allows the support ring 22 to prevent co-rotation between the sealing ring 24 and the shaft, improving wear and extrusion resistance of the sealing ring 24. To aid with this rotation prevention, the support ring 22 can comprise a rigid material that does not substantially deform under pressure and which allows the support ring 22 to stay rotationally locked in the opening of the housing during operation. Such rigid materials can include polyether ether ketone, polyimide, polyamide-imide, filled polytetrafluoroethylene, polyphenylene sulfide, polyoxymethylene, polyamide, ultra-high molecular weight polyethylene, polyurethane, and a metal such as steel or aluminum. It should be appreciated that these rigid materials are exemplary only and the support ring 22 can be formed from any desired material. The sealing ring 24, on the other hand, can comprise a sealing material, especially at the seal lip 26, that is softer (has a lower modulus) than the rigid material of the support ring 22 in order to seal against the shaft. Such sealing materials can include blends of polymers such as polytetrafluoroethylene, ultra-high molecular weight polyethylene, polyurethane, and polyester. It should also be appreciated that these sealing materials are exemplary only and the sealing ring 24 can be formed from any desired material.

Figure 2:
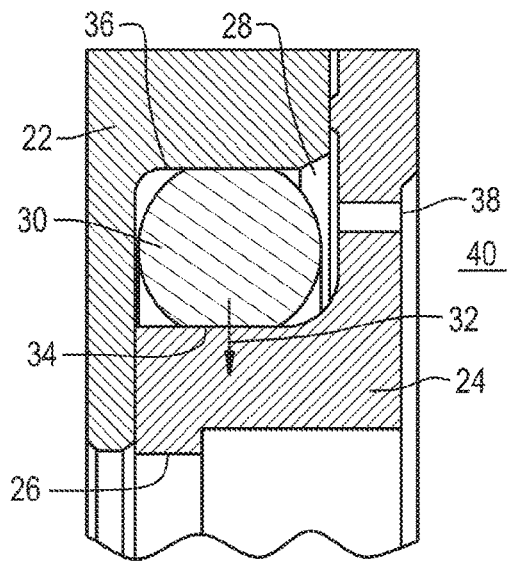
FIG. 2 is a cross-sectional view of the seal shown in FIG. 1 taken along line 2-2.

Referring now to FIG. 2, a cross-sectional view of the seal 20 is shown. As can be seen, when the support ring 22 and sealing ring 24 are locked together they form an enclosed space 28 therebetween in which an energizer 30 is held. The support ring 22 can be generally L-shaped to form a ring with an open face, with the sealing ring 24 locked to the open face of the support ring 22 to form the enclosed space 28. If forming the seal 20 by locking the sealing ring 24 to an open faced support ring 22, as shown, the energizer 30 can be placed in the open face of the support ring 22 prior to locking the sealing ring 24 to the sealing ring 22, ensuring that the energizer 30 is held within the enclosed space 28 and compressed. Optionally, the support ring 22, sealing ring 24, and/or energizer 30 can be split into two or more segments to allow for easier installation of the seal 20 in the hardware. The energizer 30 can be any type of suitable energizer, such as an O-ring, as shown, a spring, and/or an elastomeric material. The energizer 30 provides a radially inward force, designated as arrow 32, toward the seal lip 26 so that the seal 20 remains an effective seal even when there is little or no pressure in the system. As used herein, "pressure" in the sealing environment refers to fluid pressure that is transmitted mostly through pressurized media in the sealing environment. In this sense, the energizer 30 remains in contact with one or more cavity walls 34 of the sealing ring 24 and may also be contacting one or more cavity walls 36 of the support ring 22. To allow high pressure from the seal environment to be transferred to the seal lip 26 from the energizer 30, one or more activation ports 38 can be formed in the sealing ring 24 and/or the support ring 22 that extend into the enclosed space 28 and provide a path for the pressure to reach the energizer 30 and convert the pressure into more radially inward force 32.

Since the energizer 30 is enclosed in the enclosed space 28 and the pressure acts on the energizer 30 from the activation port(s) 38, the energizer 30 is forced away from the activation port(s) 38 toward the cavity walls 36 of the support ring 22 and cavity wall 34 of the sealing ring 24. The support ring 22, which can be rigid, is not prone to deforming so the energizer 30 will tend to deform the sealing ring 24, which can made of a more deformable material than the support ring 22. The activation ports 38 can therefore be formed in the sealing ring 24 and/or support ring 22 facing a high pressure side 40 of the sealing environment so that more pressure is converted into radially inward force 32 to keep the seal lip 26 loaded during operation. As can be seen in FIG. 1, which illustrates six activation ports 38, the activation ports 38 can be equally spaced from one another on the sealing ring 24 so that the pressure converted to radially inward force 32 is evenly distributed to the energizer 30 through the activation ports 38, allowing for an even force distribution on the seal lip 26 from the energizer 30. Further, since the energizer 30 is enclosed by the support ring 22 and sealing ring 24 and only affected by pressure that goes through the activation ports 38, the energizer 30 is shielded from the full effects of the pressure and contamination that may occur.

Figure 3:
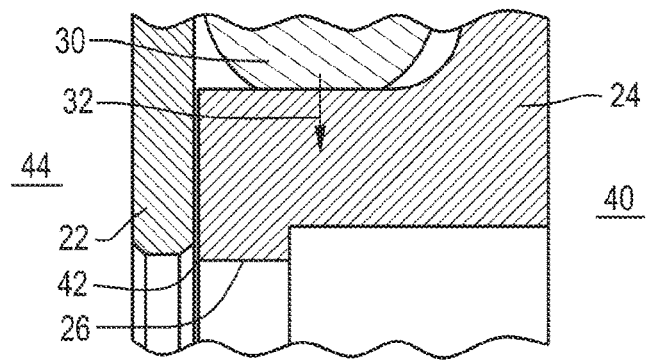
FIG. 3 is a close-up view of a portion of the cross-sectional view shown in FIG. 2 to show more detail of a seal lip of the sealing ring.

Referring now to FIG. 3, a close-up view of the seal lip 26 of the sealing ring 24 is shown. While any seal lip 26 can be formed on the sealing ring 24 to form an effective seal, the seal lip 26 shown in FIG. 3 is shaped to have a cross-section with a single contact point or small width of a surface in contact, designated as 42, that will contact the rotating object during operation. In other words, the seal lip 26 will have a single edge contacting the rotating object during operation across a circumference of the sealing ring 24. The seal lip 26 can also be formed on a low pressure side 44 of the sealing environment, i.e., opposite the side where the activation ports 38 are formed in the sealing ring 24. As opposed to seals that normally place their seal lip adjacent to the high pressure side 40, having the seal lip 26 on the low pressure side 44 and with a single contact edge improves lubrication at the contact area between the seal lip 26 and the shaft. By shifting the seal lip 26 to the low pressure side 44 of the sealing ring 24, most of the radially inward force 32 from the energizer 30 can be transferred to the single contact point 42 to improve shearing of the fluid film and thus reduce or eliminate the transfer of fluid under the seal interface. Having the seal lip 26 on the low pressure side 44 also allows adequate cooling of the sealing ring 24 by improving oil exchange below the sealing ring 24. The seal lip 26 that is biased by the radially inward force 32 can also be relatively thin and flexible in order to quickly react to changing seal environment conditions.

Figure 4:
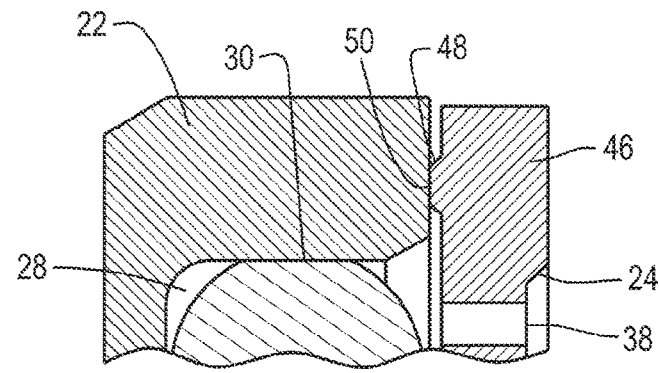
FIG. 4 is a close-up view of a portion of the cross-sectional view shown in FIG. 2 to show more detail of a flange of the sealing ring.

Referring now to FIG. 4, a close-up view of a flange 46 of the sealing ring 24 is shown. As can be seen, the flange 46 extends radially outward from the sealing ring 24 above the activation ports 38 and helps to enclose the enclosed space 28 when the sealing ring 24 is locked to the support ring 22. To help lock the sealing ring 24 to the support ring 22, the flange 46 can include a raised portion 48 that is crushed between the flange 46 and the support ring 22. In other words, the raised portion 48 is meant to be deformed during pressing of the two rings 22 and 24 together so that the raised portion 48 squeezes into, for example, a clamping groove 50 formed in the support ring 22. The raised portion 48 therefore helps to clamp the support ring 22 and sealing ring 24 together and provide a tighter lock between the two rings 22 and 24. By providing a tighter lock between the support ring 22 and the sealing ring 24, the sealing ring 24 is less prone to coming unlocked from the support ring 22 and becoming susceptible to relative co-rotation with the shaft.

Figure 5:
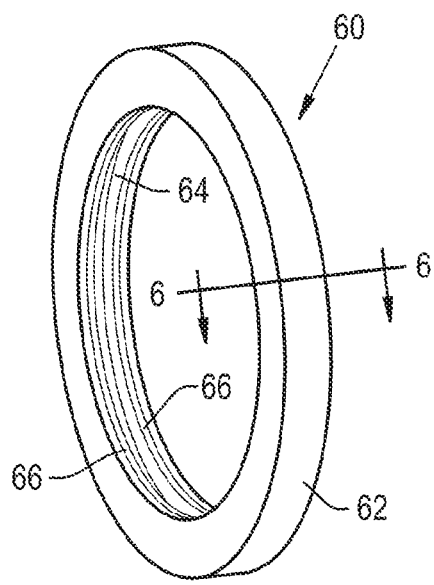
FIG. 5 is a perspective view of another embodiment of a seal according to the present invention configured for bi-directional sealing applications.

Referring now to FIG. 5, another embodiment of a seal 60 according to the present invention is shown that generally includes a U-shaped support ring 62 and a sealing ring 64 locked to the support ring 62 that has two seal lips 66. Unlike the seal 20 shown in FIGS. 1-4, which is configured for unidirectional sealing, the seal 60 shown in FIG. 5 is configured for bi-directional sealing, as evidenced by the sealing ring 64 having two seal lips 66. Other than the shape of the rings 62 and 64, however, the rings 62 and 64 of the seal 60 can be similar to the rings 22 and 24 of the seal 20 in material selection.

Figure 6:
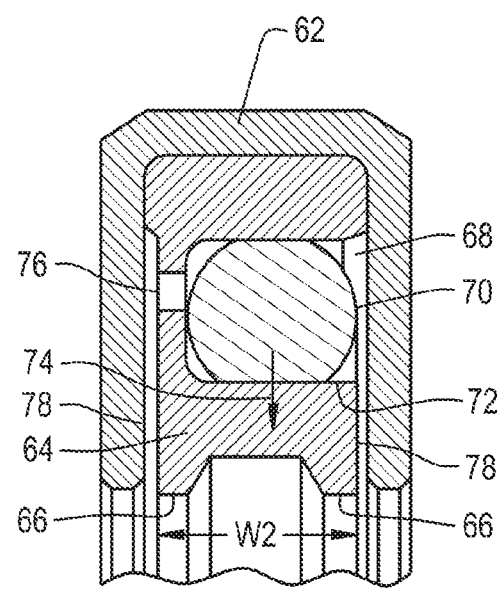
FIG. 6 is a cross-sectional view of the seal shown in FIG. 5 taken along line 6-6.

Referring now to FIG. 6, a cross-section of the ring 60 is shown. As can be seen, the support ring 62 and sealing ring 64 can form an enclosed space 68 in which an energizer 70 is held in contact with the sealing ring 64. The energizer 70 described further herein can be similar to the energizer 30 previously described. Since the support ring 62 has a U-shape to cover both sides of the sealing ring 64, the sealing ring 64 can have an energizer cavity 72 formed therein which holds the energizer 70 prior to insertion into the support ring 62. After the support ring 62 is press fit into the opening of the hardware, the sealing ring 64 with the energizer 70 held in the energizer cavity 72 can be press fit into the support ring 62 to lock the support ring 62 and sealing ring 64 together and put the energizer 70 in compression to supply a radially inward force, designated as arrow 74. The sealing ring 64 can also have one or more activation ports 76 formed therein that extend into the enclosed space 68 to provide additional pressure on the energizer 70 that can be transferred into radially inward force 74. To allow access of pressure to the energizer 70 without or in addition to forming activation ports 76 in the sealing ring 64 and/or support ring 62, one or more inner radial gaps 78 can be formed between the sealing ring 64 and the support ring 62 when locked together that extend radially away from the seal lips 66 toward the energizer 70. As can be seen in FIG. 6, the inner radial gaps 78 allow pressure to access the enclosed space 68 through either the activation ports 76 or the opening of the energizer cavity 72. This allows pressure to reach the energizer 70 regardless of what side of the seal 60 the pressure originates.

Figure 7:
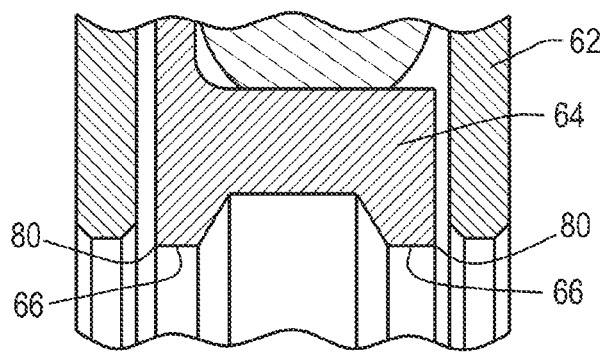
FIG. 7 is a close-up view of a portion of the cross-sectional view shown in FIG. 6 to show more detail of seal lips of the sealing ring.

Referring now to FIG. 7, a close-up view of the seal lips 66 is shown. Similarly to previously described seal lip 26, the seal lips 66 can each be shaped to have a cross-section with a single point of contact, designated by 80. Since the seal 60 is configured to be used in a bi-directional sealing environment, the seal lips 66 can be placed on opposite sides of the sealing ring 64.

Figure 8:
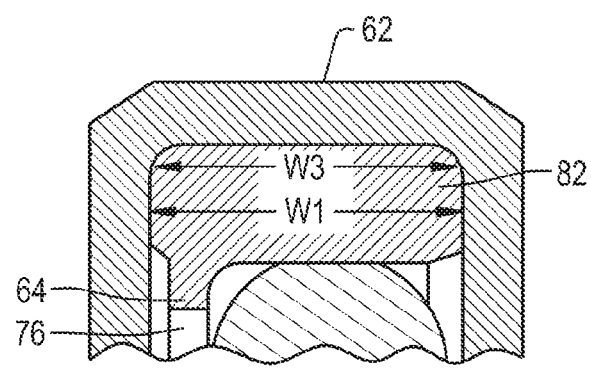
FIG. 8 is a close-up view of a portion of the cross-sectional view shown in FIG. 6 to show more detail of a flange of the sealing ring.

Referring now to FIG. 8, a close-up view of a flange 82 of the sealing ring 64 is shown. As can be seen, the flange 82 has a flange width W1 greater than a seal width W2 (shown in FIG. 6) defined between the seal lips 66 of the sealing ring 64. This increased flange width W1 can be slightly greater than a support width W3 formed in the U-shape of the support ring 62 to allow the sealing ring 64 to be press fit into the support ring 62 by deforming the flange 82 as the sealing ring 64 is pressed into the support ring 62. The increased flange width W1 can also allow the inner radial gaps 78 previously described to be formed between the support ring 62 and sealing ring 64 to provide a path for pressure to reach the energizer 70 held in the enclosed space 68.

Figure 9:
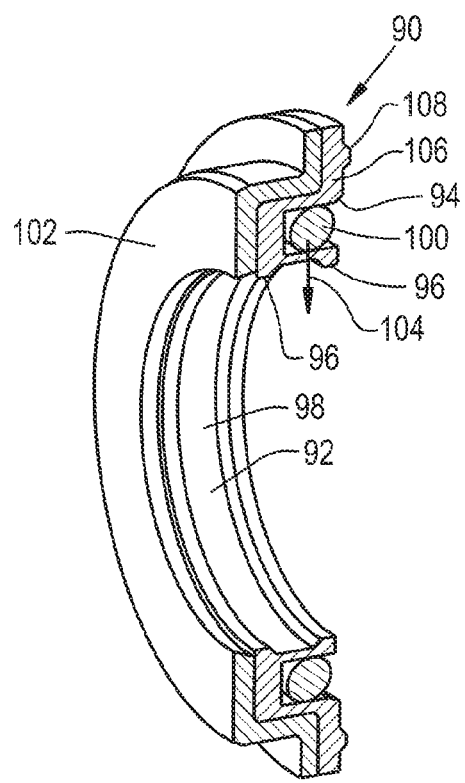
FIG. 9 is a sectional view of yet another embodiment of a seal according to the present invention.
Figure 10:
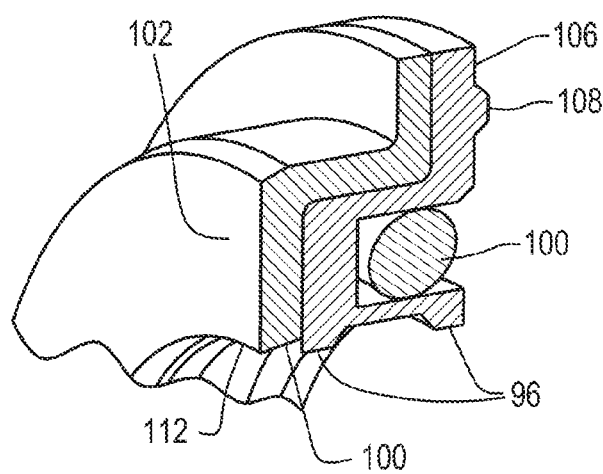
FIG. 10 is a close-up view of a portion of the sectional view shown in FIG. 9 to show more detail of a scraping edge of the support ring.

Referring now to FIGS. 9 and 10, yet another embodiment of a seal 90 formed according to the present invention is shown that generally includes a sealing ring 92 having a cavity 94 formed therein and seal lips 96 formed on an inner radius 98 of the sealing ring 92 and an energizer 100 held in the cavity 94 of the sealing ring 92. The cavity 94 is formed in the sealing ring 92 so that the cavity 94 is at least partially aligned with one of the seal lips 96 so that the energizer 100 held in the cavity 94 can bias the seal lip(s) 96 with a radially inward force, designated by arrow 104. As shown in FIG. 9, the energizer 100 is held closer to the seal lip 96 on the right side of the figure, and will thus tend to exert more radially inward force 104 on this seal lip 96. The sealing ring 92 can be locked to a support ring 102, similar to previously described seals 20 and 60, to prevent co-rotation of the sealing ring 92 and a shaft. The sealing ring 92 can be locked to the support ring 102 using a raised portion (not seen) of a flange 106 crushed between the sealing ring 92 and support ring 102 into a clamping groove (not shown) formed in the support ring 102. This allows the support ring 102 to support the sealing ring 92 on one side of the sealing ring 92 by covering the side of the sealing ring 92 to which the support ring 102 is locked. The sealing ring 92 can also have a second raised portion 108 formed on the flange 106 that can be crushed between the sealing ring 92 and a groove formed in hardware. As can be seen in FIG. 10, the support ring 102 can have a scraping edge 110 on an inner radius 112 of the support ring 102 to provide scraping ability to the seal 90 and help protect the sealing ring 92 from damage caused by contamination or contamination from one side of the sealing ring 92 to the other.

Figure 11:
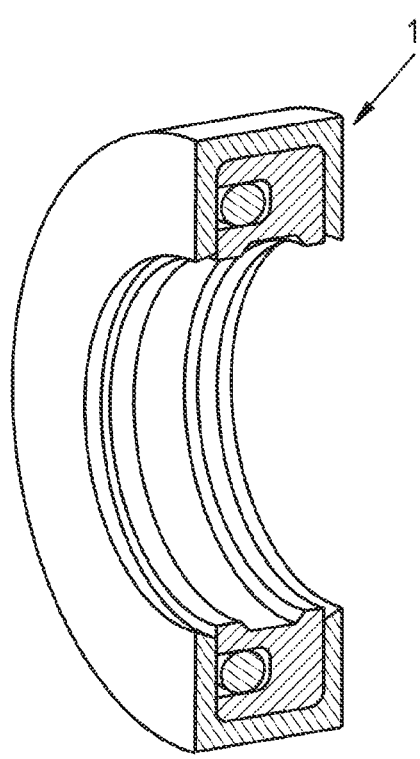
FIG. 11 is a sectional view of yet another embodiment of a seal according to the present invention.

Referring now to FIG. 11, yet another embodiment of a seal 120 formed according to the present invention is shown that is similar to previously described seal 60. The seal 120 has a significantly reduced overall radius compared to the seal 60, making the seal 120 more suitable for small shaft diameters, closed gland hardware installation, or small radial spaces. It should thus be appreciated that seals formed according to the present invention can be sized and adjusted as desired to suit many different sealing environments and hardware configurations.

Figure 12:
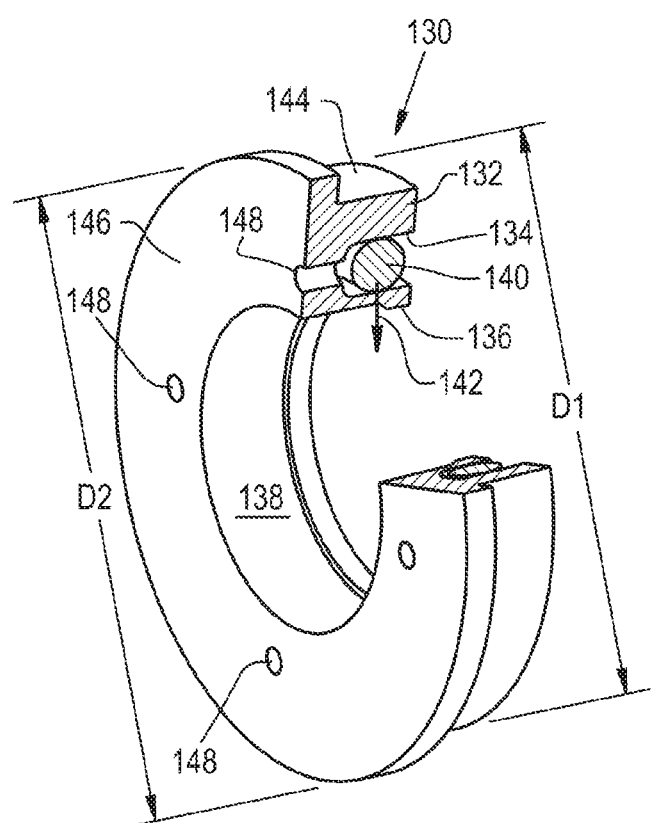
FIG. 12 is a sectional view of yet another embodiment of a seal according to the present invention.

Referring now to FIG. 12, yet another embodiment of a seal 130 formed according to the present invention is shown that includes a sealing ring 132 having a cavity 134 formed therein and a seal lip 136 formed on an inner radius 138 of the sealing ring. The cavity 134 is radially aligned with the seal lip 136 so that an energizer 140 held in the cavity 134 biases the seal lip 136 in a radially inward direction, designated by arrow 142. Unlike previously described seals, the sealing ring 132 of seal 130 does not include a support ring, but instead has a main portion 144 with a main diameter D1 that is radially aligned with the cavity 134 and a support portion 146 with a support diameter D2 that is connected to the main portion 144. To make up for the lack of a support ring, the support diameter D2 of the support portion 146 can be greater than the main diameter D1 of the main portion 144 so that the support portion 146 can be press fit into the opening of the hardware and, if the support portion 146 deforms, deform the support portion 146 sufficiently so that it becomes difficult to further deform. This allows the support portion 146 to essentially become rigid without being formed of a rigid material. The support portion 146 therefore becomes rotationally locked within the opening and since it is connected and/or integrally formed with the main portion 144, prevents co-rotation between the main portion 144, which has the seal lip 136, and the shaft. The support portion 146 can also have activation ports 148 formed through to the cavity 134 that allow pressure from the side of the sealing environment the support portion 146 is on to reach the energizer 140, for reasons that have been previously described.

Figure 13:
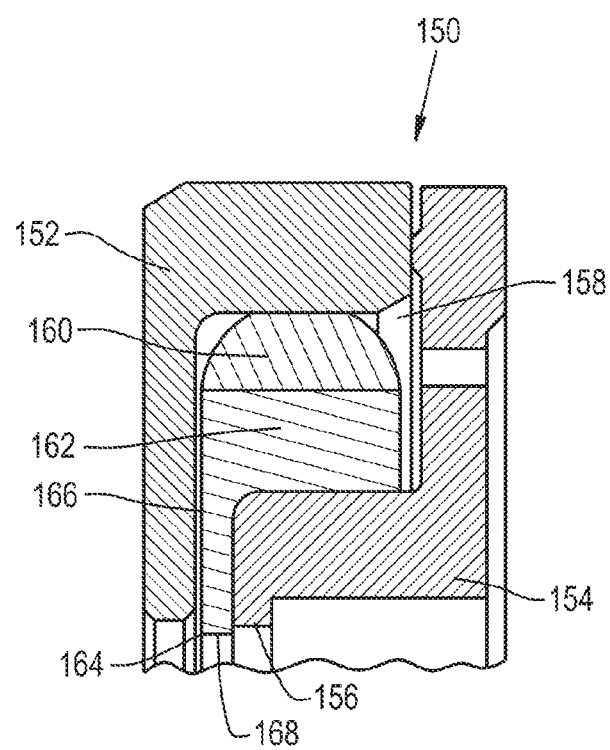
FIG. 13 is a cross-sectional view of yet another embodiment of a seal according to the present invention.

Referring now to FIG. 13, yet another embodiment of a seal 150 formed according to the present invention is shown that includes a support ring 152 locked to a sealing ring 154 with a seal lip 156 to form an enclosed space 158 therebetween and an energizer 160 held in the enclosed space 158, similar to previously described seals. Unlike previously described seals, the energizer 160 has an enclosed portion 162 held in the enclosed space 158 as well as a contacting portion 164 that extends through a radially inward gap 166 formed between the support ring 152 and sealing ring 154 to a contact surface 168 that is roughly axially aligned with the seal lip 156. This allows the contact surface 168 of the energizer 160, which can be formed of an elastomeric material, to also be in contact with the shaft while the seal lip 156, which can be formed of a non-elastomeric material, is in contact with the shaft. Otherwise, the seal 150 is similar to the seal 20 previously described.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal, comprising:
   a support ring having at least one activation port therein;
   a sealing ring locked with said support ring to form an enclosed space therebetween, said sealing ring including at least one seal lip; and
   an energizer held in said enclosed space and contacting said sealing ring, said enclosed space being open to pressurized media entry on opposite sides of said energizer, said support ring and said sealing ring having an inner radial gap formed therebetween that allows pressure to access said enclosed space, the energizer being forced away from the activation port toward the sealing ring causing a radially inward force on the sealing ring.

2. The seal according to claim 1, wherein said support ring comprises a rigid material and said sealing ring comprises a sealing material with a lower modulus than said rigid material.

3. The seal according to claim 2, wherein said support ring comprises at least one of polyether ether ketone, polyimide, polyamide-imide, filled polytetrafluoroethylene, polyphenylene sulfide, polyoxymethylene, polyamide, ultra-high molecular weight polyethylene, polyurethane, and a metal.

4. The seal according to claim 2, wherein said sealing ring comprises at least one of polytetrafluoroethylene, ultra-high molecular weight polyethylene, polyurethane, and polyester.

5. The seal according to claim 1, wherein said sealing ring includes a flange that is one of press fit into and clamped to said support ring.

6. The seal according to claim 5, wherein said support ring is U-shaped and said flange is press fit into said support ring.

7. The seal according to claim 5, wherein said support ring is L-shaped and said flange is clamped to said support ring.

8. The seal according to claim 7, wherein said flange includes a raised portion crushed between said support ring and said sealing ring.

9. The seal according to claim 1, wherein at least one of said support ring and said sealing ring has at least one activation port formed therein that extends into said enclosed space.

10. The seal according to claim 9, wherein at least one of said support ring and said sealing ring has at least three activation ports formed therein that extend into said enclosed space, said activation ports being equally spaced from one another.

11. The seal according to claim 1, wherein said at least one seal lip is shaped to have a cross-section with a single contact point.

12. The seal according to claim 11, wherein said sealing ring includes at least two seal lips, each of said seal lips being shaped to have a cross-section with a single contact point.

13. The seal according to claim 1, wherein said energizer comprises at least one of an O-ring, a spring, and an elastomeric material.

14. The seal according to claim 1, wherein said support ring includes a scraping edge on an inner radius of said support ring.

15. A seal, comprising:
    a sealing ring having a cavity formed therein and at least one seal lip on an inner radius of said sealing ring, said at least one seal lip being at least partially radially aligned with said cavity formed in said sealing ring, said sealing ring having at least one activation port therein;
    an energizer held within said cavity of said sealing ring and biasing said at least one seal lip radially inward, said cavity being open to pressurized media entry on opposite sides of said energizer; and
    a support ring locked to said sealing ring, said support ring and said sealing ring having an inner radial gap formed therebetween that allows pressure to access said cavity, the energizer being forced away from the activation port toward the sealing ring causing a radially inward force on the sealing ring.

16. The seal according to claim 15, wherein said support ring covers one side of said sealing ring.

17. The seal according to claim 15, wherein said sealing ring includes a flange with a raised portion crushed between said sealing ring and said support ring.

* * * * *